(No Model.)
H. B. WEAVER.
ATOMIZER.
No. 587,890. Patented Aug. 10, 1897.
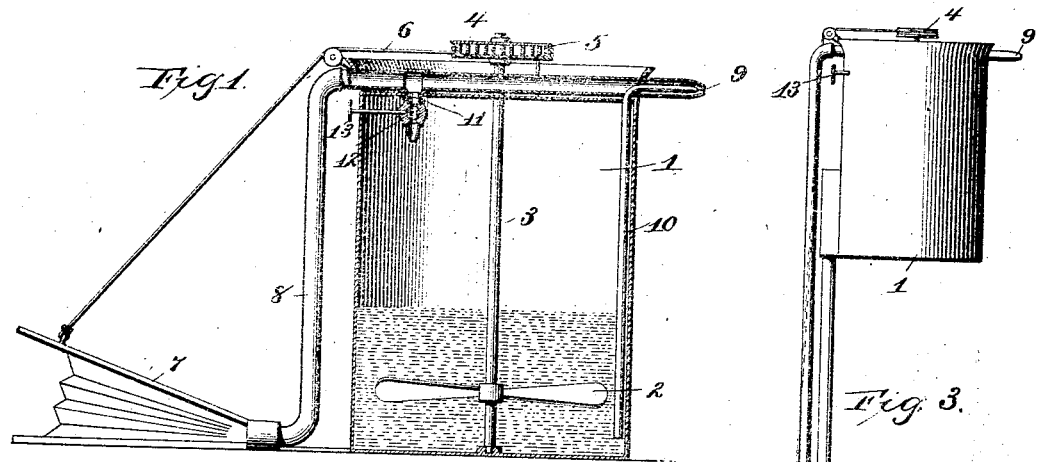
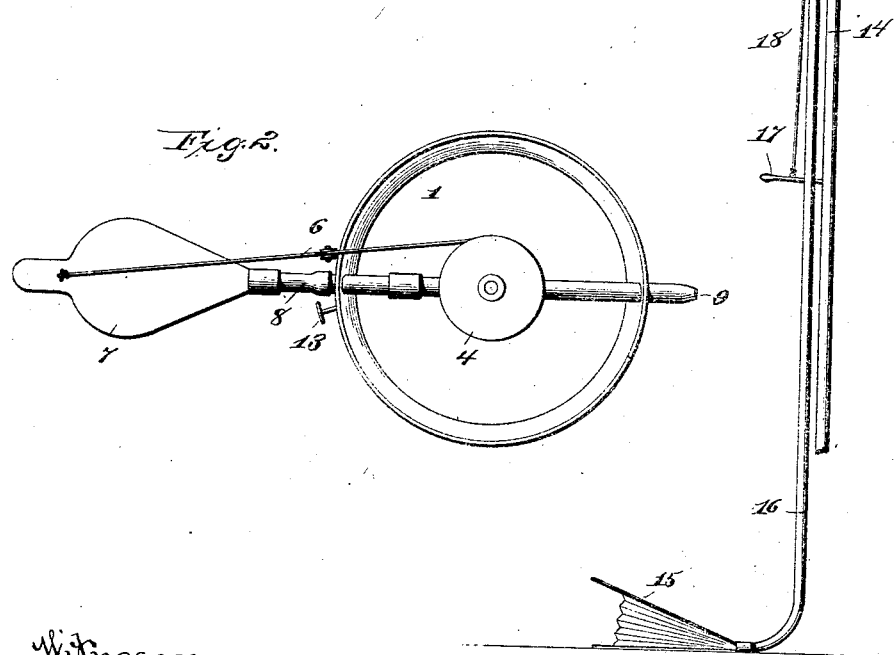
Witnesses
E. C. Wurdeman
A. S. Williamson
Inventor
Harry B. Weaver
by Geo. H. Hogue
Attorney

UNITED STATES PATENT OFFICE.

HARRY B. WEAVER, OF MACUNGIE, PENNSYLVANIA.

ATOMIZER.

SPECIFICATION forming part of Letters Patent No. 587,890, dated August 10, 1897.

Application filed January 11, 1896. Renewed October 9, 1896. Serial No. 608,422. (No model.)

*To all whom it may concern:*

Be it known that I, HARRY B. WEAVER, a citizen of the United States, residing at Macungie, Pennsylvania, have invented certain new and useful Improvements in Atomizers, of which the following is a specification.

My invention relates to a new and useful improvement in an apparatus for spraying liquid poison upon plants or trees for the purpose of exterminating insect life; and with this end in view my invention consists in certain details of construction and combination of elements hereinafter set forth, and then specifically designated by the claims.

It is well known that great injury is occasioned to certain plants and trees on account of insects devouring the leaves thereof, and many attempts have been made to destroy this insect life by the use of liquid poison, but with little success on account of the liquid being applied in a body or in such coarse spray as to form drops upon the leaves and fall therefrom, thus leaving a large portion of the plant unaffected, so that but a small proportion of the insects are destroyed, while at the same time a large quantity of liquid is used. I aim to obviate this difficulty by so constructing an apparatus as to apply the poison in an exceedingly fine vapor, which will completely envelop the leaves of the plant and fall thereon much after the manner of dew, so as to affect every part thereof, thus completely exterminating the insect life.

In order that those skilled in the art to which this invention appertains may understand how to make and use the same, I will describe its construction and operation in detail, referring by numbers to the accompanying drawings, forming part of this specification, and in which—

Figure 1 is a central vertical section of the tank or reservoir of the apparatus, operating parts being in elevation. Fig. 2 is a plan view, and Fig. 3 is an elevation showing my improvement adapted to be used upon a reach-pole in order that access may be had to the branches of trees and the like.

Similar numbers denote like parts in the several views of the drawings.

1 represents the tank or reservoir, in which is arranged an agitator 2, consisting of any suitable number of blades secured to a vertical shaft 3, which latter is journaled in said tank and projects through the cover thereof.

4 is a drum secured upon this shaft and having coiled therein a spring 5, one end of which is attached to the drum and the other to the top of the reservoir.

6 is a cord which is secured to the periphery of the drum and adapted to be wound thereon and unwound therefrom when the movable member of the bellows 7 is operated. This bellows may be of ordinary construction, consisting of two handles by which the apparatus is supported and operated, and leading therefrom is a tube 8, which passes upward parallel with the side of the tank and terminates in a nozzle 9.

10 is a small tube which leads from below the surface of the liquid within the reservoir into the tube 8 and is bent parallel therewith, terminating in a small orifice just inside of the opening of the nozzle.

11 is an inlet whereby air is supplied to the reservoir above the surface of the liquid in order to prevent a vacuum therein, and 12 is valve having a hand-wheel 13, by means of which said valve may be operated. This inlet leads from the tube 8, so that by the proper manipulation of the valve a pressure may be created upon the liquid within the reservoir for the purpose of forcing said liquid upward through the tube 10.

From this description the operation of my improvement will be obviously as follows: The apparatus is supported and conveyed from place to place by the handles of the bellows, the stationary one of which being secured to the bottom of the tank. Upon the movable handle of the bellows being operated air will be forced through the nozzle 9, which by induction, assisted by the pressure above described created upon the surface of the liquid, will cause said liquid to rise in the tube 10 and issue in a small jet from the orifice, where it will combine with the air in its passage from the nozzle, said air holding the liquid in suspension, as does the atmosphere moisture under certain conditions, so that it is only necessary to direct the flow of the air from the nozzle upon the plants to be treated, when said plants will be completely enveloped by the moisture drawn from the reservoir. During this operation of the bellows-handle the cord 6 will be drawn to and fro, causing the agitator-blades to be revolved back and forth within the liquid, thus preventing precipitation of the poison element therein.

It sometimes becomes desirable to treat trees and vines in the manner just described, in which case I arrange my apparatus upon a reach-pole 14 and provide a foot-bellows 15, which is connected to the reservoir by means of a rubber or other flexible hose 16, in which case I also find it desirable to operate the agitator separate from the bellows, and I therewith provide a hand-lever 17, which is connected by a cord 18 to the drum, as above described. By this arrangement the operator is enabled to bring the nozzle of the apparatus in proximity to the branches of a tree of considerable height, and he then operates the bellows by pressing his foot thereon and the agitator by bearing upon the lever 17. Any of the well-known liquid poisons may be used, such as paris-green dissolved in water.

Having thus fully described my invention, what I claim as new and useful is—

1. In an atomizer, a reservoir having journaled therein a shaft, an agitator secured to said shaft and adapted to revolve therewith, means for revolving said shaft, the tube 8, extending across the upper portion of the reservoir, the tube 10, leading from the bottom of the reservoir and terminating within the tube 8, axially therewith, an air-inlet leading from the tube 8 into the reservoir, a valve for controlling said inlet and a bellows adapted to supply air to the tube 8 under pressure, whereby the liquid in the reservoir is elevated through the tube 10, and commingled with the air issuing from the nozzle, substantially as and for the purposes set forth.

2. In a device of the character described, a reservoir, a shaft journaled within the reservoir, an agitator on the shaft, a drum secured on the end of the shaft, a coil-spring connecting the drum to the top of the reservoir, a tube leading upward from the lower part of the interior of the reservoir to the top, a pipe inclosing the end of the tube, an outlet from said pipe leading into the reservoir and means for supplying the pipe with air under pressure and for revolving the drum against the action of the coil-spring, as and for the purpose described.

In testimony whereof I have hereunto affixed my signature in the presence of two subscribing witnesses.

HARRY B. WEAVER.

Witnesses:
H. B. YINGLING,
J. C. YINGLING.